(12) United States Patent
Grandjean et al.

(10) Patent No.: US 9,786,398 B2
(45) Date of Patent: Oct. 10, 2017

(54) NANOCOMPOSITE SOLID MATERIAL BASED ON HEXA- AND OCTA-CYANOMETALLATES, METHOD FOR THE PREPARATION THEREOF AND METHOD FOR FIXING MINERAL POLLUTANTS USING SAID MATERIAL

(75) Inventors: Agnes Grandjean, Saint Marcel de Careiret (FR); Yves Barre, Uchaux (FR); Yannick Guari, Prades le Lez (FR); Joulia Larionova, Preades le Rez (FR); Christian Guerin, Grabels (FR)

(73) Assignees: COMMISSARIAT A L'ENERGIE ATOMIQUE ET AUX ENERGIES ALTERNATIVES, Paris (FR); CENTRE NATIONAL DE LA RECHERCHE SCIENTIFIQUE, Paris (FR); UNIVERSITE DE MONTPELLER II, Montpellier (FR)

( * ) Notice: Subject to any disclaimer, the term of this patent is extended or adjusted under 35 U.S.C. 154(b) by 195 days.

(21) Appl. No.: 13/321,164

(22) PCT Filed: May 20, 2010

(86) PCT No.: PCT/EP2010/057009
§ 371 (c)(1),
(2), (4) Date: Jan. 31, 2012

(87) PCT Pub. No.: WO2010/133689
PCT Pub. Date: Nov. 25, 2010

(65) Prior Publication Data
US 2012/0125856 A1 May 24, 2012

(30) Foreign Application Priority Data

May 20, 2009 (FR) ..................... 09 53379

(51) Int. Cl.
*C03C 17/00* (2006.01)
*G21F 9/30* (2006.01)
(Continued)

(52) U.S. Cl.
CPC ............ *G21F 9/305* (2013.01); *C03C 11/005* (2013.01)

(58) Field of Classification Search
CPC ... B05D 1/38; B05D 3/00; B05D 3/10; B82Y 30/00; C01B 33/32; C02F 1/28; C02F 1/42; C02F 1/62
(Continued)

(56) References Cited

U.S. PATENT DOCUMENTS 6,482,380 B1   11/2002   Nenoff et al.
6,558,552 B1    5/2003   Loos-Neskovic et al.
(Continued)

FOREIGN PATENT DOCUMENTS

RU        2113024 C1    6/1998

OTHER PUBLICATIONS

Antropova et al. (Optica Applicata, vol. 38, No. 1, 2008, 265 pages).*
(Continued)

*Primary Examiner* — Dirk Bass
*Assistant Examiner* — Hayden Brewster
(74) *Attorney, Agent, or Firm* — Knobbe Martens Olson and Bear LLP

(57) ABSTRACT

A nanocomposite solid material includes nanoparticles of a metal coordination polymer with CN ligands comprising $M^{n+}$ cations, in which M is a transition metal and n is 2 or 3; and anions $[M'(CN)_m]^{x-}$ in which M' is a transition metal, x is 3 or 4, and m is 6 or 8. The $M^{n+}$ cations of the coordination polymer are bound through an organometallic bond to an organic group of an organic graft chemically (Continued)

attached inside the pores of a support made of porous glass. The material can be used in a method for fixing (binding) a mineral pollutant, such as radioactive cesium, contained in a solution by bringing the solution in contact with the nanocomposite solid material.

40 Claims, 3 Drawing Sheets

(51) Int. Cl.
*C03C 11/00* (2006.01)
*B05D 3/00* (2006.01)
*C09K 3/00* (2006.01)
*B82Y 30/00* (2011.01)

(58) Field of Classification Search
USPC .............. 65/399; 210/681, 682, 688; 216/39; 252/184; 423/326; 427/380; 501/154
See application file for complete search history.

(56) References Cited

U.S. PATENT DOCUMENTS

2007/0117224 A1* 5/2007 Croker et al. ................ 436/527
2011/0128535 A1 6/2011 Baker et al.

OTHER PUBLICATIONS

Hoffman et al.—Silica-Based Mesoporous Organic-Inorganic Hybrid Materials, Angew. Chem. Int. Ed., 2006, 45, pp. 3216-3251.*
Raszewski et al.—Preparation and Characterization of Porous-Walled Hollow Glass Microspheres [Apr. 21, 2008; 20 pages].*
Rockett et al. (The High-Silica Liquidus Surface of the System Na2O—B2O3—SiO2, Comm. of the American Ceramic Soc., Nov. 1981, pp. C-148-C-149).*
J. Lehto et al., "Effects of Gamma Irradiation on Cobalt Hexacyanoferrate (II) Exchangers", Radiat. Phys. Chem., 1994, vol. 43, No. 3, pp. 261-264.
H. Loewenschuss, "Metal-Ferrocyanide Complexes for the Decontamination of Cesium from Aqueous Radioactive Waste", Jun. 1982, vol. 2, No. 4, pp. 327-341.
Mimura et al., "Selective Removal of Cesium from Simulated High-level Liquid Wastes by Insoluble Ferrocyanides", Journal of Nuclear Science and Technology, Jun. 1997, vol. 34, No. 6, pp. 607-609.
E.H. Tusa et al., "Industrial Scale Removal of Cesium with Hexacyanoferrate Exchanger-Process Realization and Test Run", Nuclear Technology, Sep. 1994, vol. 107, pp. 279-284.
Harjula et al.,"Removal of Radioactive Cesium from Nuclear Waste Solutions with the Transition Metal Hexacyanoferrate Ion Exchanger CsTreat", Nuclear Science and Engineering, 2001, vol. 137, pp. 206-214.
French Search Report dated Feb. 24, 2010 of corresponding French Patent Application No. 0953379—1 page.
Harjula et al., "Use Inorganic Ion Exchange Materials as Precoat Filters for Nuclear Waste Effluent Treatment", Reactive and Functional Polymers, 2004, vol. 60, pp. 85-95.
Mimura et al.,"Selective Removal of Cesium from Highly Concentrated Sodium Nitrate Neutral Solution by Potassium Nickel Hexacyanoferrate(II)-Loaded Silica Gels", Solvent Extraction and Ion Exchange, Mar. 1, 1999, vol. 23, No. 4, 14 pages.
Ambashta et al.,"Nano-Aggregates of Hexacyanoferrate (II)-Loaded Magnetite for Removal of Cesium from Radioactive Wastes", Journal of Magnetism and Magnetic Materials, 2003, vol. 267, pp. 335-340.
Mardan et al.,"A New Method for Preparation of Silica Potassium Cobalt Hexacyanoferrate Composite Ion Exchanger from Silica Sol", Journal of Radioanalytical and Nuclear Chemistry, 2002, vol. 251, No. 3, pp. 359-361.
Sharygin et al.,"A Granular Inorganic Cation-Exchanger Selective to Cesium", Journal of Nuclear Science and Technology, 2007, vol. 44, No. 5, pp. 767-773.
Loos-Neskovic et al., "A Copper Hexacyanoferrate/Polymer/Silica Composite as Selective Sorbent for the Decontamination of Radioactive Caesium", Radiochim. Acta, 1999, vol. 85, pp. 143-148.
S. Milonjic et al., "Sorption of Cesium on Copper Hexacyanoferrate/Polymer/Silica Composites in Batch and Dynamic Conditions", Journal of Radioanalytical and Nuclear Chemistry, 2002, vol. 252, No. 3, pp. 497-501.
Chang et al.,"Nickel Hexacyanoferrate Multilayers on Functionalized Mesoporous Silica Supports for Selective Sorption and Sensing of Cesium", Microporous and Mesoporous Materials, 2008, vol. 109, pp. 505-512.
Lin et al.,"Electrosynthesis, Characterization, and Application of Novel Hybrid Materials based on Carbon Nanotube-Polyaniline-Nickel Hexacyanoferrate Nanocomposites", Journal of Materials Chemistry, 2006, vol. 16, pp. 585-592.
Folch, et al., "Syntheis and behaviour of size controlled cyano-bridged coordination polymer nanoparticles with hybrid mesoporous silica". New Journal of Chemistry, Royal Society of Chemistry, GB, vol. 32, pp. 273-282, 2008.
International Preliminary Examination Report dated Aug. 29, 2011 for PCT Application No. PCT/EP2010/057009 filed May 20, 2010.
International Preliminary Examination Demand dated Feb. 25, 2011 for PCT Application No. PCT/EP2010/057009 filed May 20, 2010.
International Search Report dated Dec. 1, 2010 for PCT Application No. PCT/EP2010/057009 filed May 20, 2010.
Phalippou, Jean "Aspects théoriques" Verres, AF 3 600, 15 pages.

* cited by examiner

A : crystallization domain
B : extension of the metastable demixing domain $Na_2O$-$SiO_2$
C : sodium borosilicate domain (laboratory glassware)
D : metastable demixing domain $Na_2O$-$B_2O_3$-$SiO_2$

NANOCOMPOSITE SOLID MATERIAL BASED ON HEXA- AND OCTA-CYANOMETALLATES, METHOD FOR THE PREPARATION THEREOF AND METHOD FOR FIXING MINERAL POLLUTANTS USING SAID MATERIAL

RELATED APPLICATIONS

This application is a U.S. National Phase of International Application No. PCT/EP2010/057009, filed May 20, 2010, designating the U.S., and published in French as WO 2010/133689 on Nov. 25, 2010 which claims the benefit of French Patent Application No. 0953379 filed May 20, 2009.

BACKGROUND OF THE INVENTION

1. Field of the Invention

The invention relates to a nanocomposite solid material based on hexa- and octa-cyanaometallates.

More specifically, the invention relates to a nanocomposite solid material comprising nanoparticles of a metal coordination polymer with CN ligands comprising metal cations and hexa- and octa-cyanometallate anions, notably hexa- and octa-cyanoferrate anions, said nanoparticles being bound through an organometallic bond to an organic graft chemically attached to the interior of the pores of a porous solid support.

The present invention also relates to a method for preparing said solid material.

The present invention also relates to a method for fixing (binding) mineral pollutants contained in a solution, using said material.

The technical field of the invention may generally be defined as that of mineral fixers (binders).

2. Description of Related Art

Many mineral fixers (binders) have been used for fixing (binding) various mineral pollutants such as metal cations contained in various media and effluents from various industries and in particular from the nuclear industry.

Indeed, the nuclear industry uses for treating effluents with low or medium radioactivity, notably in decontamination and dismantling activities, purification techniques with volume reduction consisting in fixing (binding) radio-isotopes present in the solutions onto a mineral solid, either by ion exchanges, or by co-precipitation in order to concentrate, confine radioactivity in a reduced space.

The volumes presently treated are enormous and attain several tens of thousands of m³/year for France. The treated liquids are also of varying nature since the question is to both process primary cooling waters of nuclear plants and various effluents coming into contact with radio-isotopes.

As examples of radioactive effluents which require treatment, mention may thus be made of:
- effluents from processing operations of used nuclear fuel, evaporation concentrates,
- effluents from ponds for storing used nuclear fuel,
- all the washing and rinsing effluents such as the effluents from the rinsing and washing of installations, of monitoring laboratories, washroom facilities of controlled areas, etc.
- solutions for regenerating resins etc.

Among conventional mineral fixers (binders) applied notably in the nuclear industry, mention may be made of products based on manganese oxides of the Manox® type which are used for fixing (binding) elements present in solution, under various chemical forms, said elements for example being Ag, Sb, Ra, or Pb; and iron hydroxide used for fixing (binding) transuranic elements by co-precipitation. However, separation of cesium from aqueous effluents is difficult with these conventional mineral fixers (binders) since it has low affinity for the latter.

Now, radioactive cesium decontamination of liquid effluents is a major problem. Indeed, $^{137}Cs$ which has a half-life close to 30 years and $^{135}Cs$ which has a half-life of about $2.10^6$ years, are the most abundant among uranium fission products, while $^{134}Cs$ which has a half-life of about 2 years is an activation product of nuclear power stations.

Hexacyanoferrates (II) and (III) of many transition metals as for them have very strong affinity for cesium over a wide pH range and good resistance to irradiation [1] [2].

This is the reason why hexacyanoferrates, notably insoluble hexacyanoferrates, such as hexacyanoferrates (II) of Cu, Ni and Co, but also hexacyanoferrates of alkaline metals are among the most currently used mineral fixers (binders), in particular in the nuclear industry for separating, recovering and fixing (binding) metal ions. These insoluble hexacyanoferrates or those of alkaline metals are in particular used as ion exchangers for fixing (binding) the ions of radioactive alkaline metals such as cesium 137 with a long half-life from various industrial and nuclear effluents, for example from strongly acid solutions stemming from the reprocessing of irradiated fuels and from solutions already mentioned above.

Presently, insoluble hexacyanoferrates are thus involved in most of the methods for processing liquid radioactive waste by co-precipitation.

Potassium nickel hexacyanoferrate (II) (KNTFC) is the most studied ion exchanger for Cs decontamination. Extraction of cesium is accomplished by 1-for-1 ion exchange between potassium and Cs of the solution to be treated. This material is obtained industrially by co-precipitation of $Ni(NO_3)_2$ and $K_4Fe(CN)_6$ [3].

Hexacyanoferrates, if they have high selectivities, however have the essential drawback of having low stability, low mechanical strength which makes it difficult or even impossible to pack them in a column because of a reduction in the volume occupied by the fixer (binder) and possibly clogging which limits the number of passages of the solution in the column.

Hexacyanoferrates when they are prepared in powder form form mechanically unstable grains and are mechanically brittle, while in the compact massive form, their low specific surface area often leads to slow reaction kinetics which strongly limits their efficiency.

Indeed, it is generally difficult to combine a compact form with a high reaction rate.

Harjula et al., in Finland, were the first to propose the use of solid (massive) hexacyanoferrates for a decontamination method carried out in a column, at an industrial scale [4], [5]. These are solid (massive) potassium cobalt-hexacyanoferrates (II) which are applied for only treating limited volumes of solutions because of clogging.

In order to increase the mechanical strength of these hexacyanoferrate materials, in order to use them in a decontamination method carried out in a column, at least the three solutions are proposed in the prior art:
- the first consists of synthesizing these materials by precipitation on a solid support such as an organic resin or a bentonite;
- the second consists of precipitating particles of these materials within insoluble polymers, such as poly(vinyl acetate);

finally the third consists of precipitating particles of these materials directly within a porous inorganic support, for example of the mesoporous silica type.

Composite materials comprising hexacyanoferrates and a solid support are thereby obtained. This solid support may be an organic support or an inorganic support.

If the interest is focused on composite materials with organic supports, reference may notably be made to the document of Harjula et al. [6], which, after having tested solid (massive) hexacyanoferrates, have proposed the use of fine particles of hexacyanoferrates mixed with an organic polymer for synthesizing inorganic/organic hybrid ion exchange resins. The description of the synthesis method is not presented.

The stability of these composites with an organic support is better, but the presence in majority of organic compounds strongly limits the possibilities of uses notably because of radiolysis and poses problems for the disposal of these materials.

In particular, the presence of organic compounds in large amounts limits the conditioning of these waste materials by a conventional route of the vitrification type because of the difficulties encountered during calcination and of the reduction in the synthesis throughput of the glass.

Further, the mineral portion always has the property of non-reversibility of the fixing (binding).

If the interest is now focused on composite materials with an inorganic, mineral support, they may be prepared by synthesis by co-precipitation within the support, by synthesis via a sol-gel route, by direct synthesis within a porous inorganic support, or via other routes.

A synthesis method by co-precipitation within the support is described in the document of Mimura et al. [7] which proposes co-precipitation via a direct route on an inorganic support for Cs decontamination with a column process. Potassium nickel hexacyanoferrate (II) (KNiFC) is synthesized within a silica gel by successive impregnation of the macropores with solutions of $Ni(NO_3)_2$ and then of $K_4Fe(CN)_6$. The KNiFC is then uniformly dispersed within the silica gel matrix and the KNiFC filling percentage is controlled by the number of impregnation cycles.

More recently, the document of Ambashta et al. [8] proposes the use of a magnetite-potassium nickel hexacyanoferrate composite for decontamination of Cs from radioactive effluents, assisted with a magnetic field. This composite is obtained by co-precipitation of KNiFC in an aqueous medium on magnetite particles. This magnetic complex according to the authors has the same properties as the conventional KNiFC but allows much easier recovery of the particles after separation of Cs, thanks to the magnetic nature of these particles.

With this type of synthesis by co-precipitation within the support, the composition of the final product is poorly controlled and its properties are not very reproducible. Indeed, the deposited amount of hexacyanoferrate is very poorly controlled by the co-precipitation since the adhesion of the mineral binder onto the inorganic support is exclusively accomplished mechanically and since the hexacyanoferrate fixer (binder) is therefore weakly bound to the support. The fixer (binder) may therefore be easily detached during the decontamination step. This synthesis also systematically applies a large amount of hexacyanoferrate, which is a nuisance for treating and conditioning the thereby generated waste.

A direct synthesis method via a sol-gel route is described in the document of Mardan et al. [9] where it is proposed to carry out precipitation of the hexacyanoferrate directly during the gelling of a silica sol. To do this, a silica sol is first gelled in the presence of a solution of $K_4Fe(CN)_6$. Next, the obtained hydrogel $SiO_2$—$K_4Fe(CN)_6$ is mixed with a solution of $Co(NO_3)_2$ in acetone in order to obtain the hydrogel $SiO_2$—KCoFC. This composite is then washed and then dried in air at 115° C. Particles of porous $SiO_2$—KCoFC composites with a pore surface of the order of 180 $m^2/g$ with pores diameters between 0.005 and 0.01 µm and a pore volume of the order of 0.4 $cm^3/g$ are thereby obtained.

The composition of the obtained hexacyanoferrate is poorly controlled. A composite with a composition $K_{1.69}Co_{0.93}Fe(CN)_6$, with a ratio of the order of 0.15 g KCoFC/g of $SiO_2$ is obtained. This composite is tested in a model solution (1M HCl, with 10 ppm of Cs) in a batch method, and not on a column. Under these conditions, a Kd of 5.73 $10^5$ ml/g of composite is obtained.

Another example of this type of hybrid inorganic-inorganic material has been proposed more recently in documents [10] and [10bis], and then marketed. Here also, the description of the synthesis method is brief.

As earlier, it seems that this is a direct synthesis of potassium nickel-hexacyanoferrate within a zirconium hydroxide gel. According to the authors of this article, zirconium hydroxide was selected for applications to basic solutions, i.e. with a pH>12. The obtained material, called «Thermoxid-35», appears as granules with a diameter from 0.4 to 1 mm, containing of the order of 33% by mass of $ZrO_2$, 38% by mass of water and 28% by mass of potassium nickel-hexacyanoferrate.

This material has a porosity, for which the pore volume is of the order of 0.35 to 0.4 $cm^3/g$ for a pore size of the order of 6 nm. This composite was tested for adsorption of Cs at concentrations ranging from 0.01 to 2.0 mmol/L in a solution for which the pH varies between 6.2 and 9.6 and in the presence of 1 mol/L of NaCl. In every case, Kds of more than 1.0 $10^4$ $cm^3/g$ are obtained.

Like the standard synthesis by co-precipitation, the elaboration of composites by co-precipitation in situ via a sol-gel route also uses a large amount of hexacyanoferrate, which may attain up to 30%, but also a non-negligible amount of water. This may pose problems for treating and conditioning the thereby generated waste. Indeed, large amounts of water may cause release of hydrogen by radiolysis during storage.

Further, laboratory tests showed that the sorption kinetics on the «Thermoxid» was very slow since about 300 hours were required for attaining equilibrium.

Finally, possible vitrification of these compounds rich in hexacyanoferrates may cause evolvement of toxic hydrocyanic acid and which may promote volatilization of the thereby fixed (bound) cesium, then making the decontamination inoperative.

Direct synthesis of hexacyanoferrate within a porous inorganic support is described in documents [11], [12] and [13] of Loos Neskovic et al. who propose the use of porous silica beads covered with an anion exchange polymer on which is fixed (bound) an insoluble metal hexacyanoferrate in the form of a thin layer.

In this composite, the metal hexacyanoferrate anion is adsorbed on the polymer by electrostatic interactions.

The method used for synthesizing this composite is the following: an impregnation of a porous mineral support such as silica with a polymer solution, for example of the polyvinylimidazole or polyamine type, is first of all achieved. Next, the thereby coated support is cross-linked with a cross-linking agent such as methyl iodide. Optionally it is possible to generate cationic groups, such as ammonium, phosphonium, sulfonium groups on this polymer.

At the end of these steps, one has a solid support coated with a film of anion exchange polymer.

The following step consists of impregnating this material with an aqueous solution of alkaline metal (sodium or potassium) hexacyanoferrate (II) or (III). The fixing (binding) of the anionic portion Fe $(CN)_6^{4-}$ is thereby obtained on the cationic groups of the polymer. This fixing (binding) is accomplished by forming bonds of the electrostatic type. The following step, after washing, consists of dipping this solid support in a salt, for example copper nitrate, the metal of which corresponds to the insoluble hexacyanoferrate which is desirably obtained. The insoluble metal, for example cooper or nickel, hexacyanoferrate weight content is of the order of 3% based on the mass of the mineral support such as silica.

This material may then be packed into a column and it may be applied continuously in a method for decontaminating cesium-rich solutions, the latter being selectively fixed (bound) by the hexacyanoferrates. The mechanical stability of these materials is very good and they may be used over a wide range of pHs.

Nevertheless, the presence of an organic polymer in a large amount, since it covers the whole of the inorganic support, poses the problem of radiolysis after fixing (binding) of the cesium on the one hand and the disposal problem on the other hand.

Indeed, the problem is posed of knowing what will be the outcome of this material after extraction, since if it is sent to vitrification, the organic presence in a significant amount is a problem for conducting the present vitrification process.

The authors state that these materials may be vitrified. But, during vitrification, the presence of large amounts of polymer may generate problems, while the high applied temperatures during this vitrification step may cause volatilization of the cesium.

In other words, the method described in the documents of Loos-Neskovic et al. uses several organic compounds which are on the one hand the « anion exchanger» polymer and optionally a cross-linking compound. The presence in a non-negligible amount of these organic compounds is a problem for treating and conditioning the thereby generated waste. Indeed on the one hand, there may be evolvement of hydrogen by radiolysis of these compounds, and on the other hand, possible direct vitrification of these materials, if it allows removal of these polymers by decomposition, generates gas evolvement which may also carry away the Cs confined within the support.

Very recently, in the document of Chin Yuang Chang et.al [14], the use of functionalized mesoporous silica supports was proposed for inserting multilayers of potassium nickel-hexacyanoferrate (NiHCF=$K_2NiFe(CN)_6$) therein by successive adsorption of $Ni^{2+}$ and of $Fe(CN)_6^{4-}$. The functionalized silica support is a silica functionalized with propyl-ethylenediamine triacetate, (PEDTAFS). Indeed, propyl-ethylenediamine triacetate (PEDTA) may chelate Ni(II) and is thus used as an anchoring point for the growth of multilayers of NiHCF. In order to prepare this material, NiHCF is synthesized within a PEDTAFS powder by first immersing this powder in a solution of $Ni(NO)_3$. Next, after filtration and rinsing, the powder is then immersed in a solution of $K_4(Fe(CN)_6)$, and then again filtered and rinsed. These steps are repeated several times, i.e. 5 times. Cesium sorption tests are carried out batchwise. Kds of more than $10^6$ mL/g are obtained, for a solution with about 100 ppm of Cs in the form of nitrate and in the presence of other ions, i.e. $KNO_3$ and/or $NaNO_3$ up to 3.0 M. But the fact that the functionalized porous silica also adsorbs Cs should also be taken into account.

The vitrification of the materials described in this document, after fixing (binding) of the pollutants such as cesium, may cause many problems notably related to the volatilization and to the release of the pollutant such as cesium, during this vitrification step, because of the very high applied temperatures.

Other routes for synthesizing composite materials have also been studied. Thus, the document of Lin and Cui [15] describes organic-inorganic nanocomposites for the treatment of radioactive effluents. They use an electrochemical approach for synthesizing these materials consisting of a thin conducting polyaniline film and of nanoparticles of nickel hexacyanoferrates deposited on a matrix of carbon nanotubes. This material is intended to be used in a decontamination method by ion exchange assisted by electrochemistry.

These materials cannot be used in a column method and the treatment, the disposal of these materials which are very rich in carbon after fixing (binding), extraction of the pollutant, is difficult.

The document of Folch B. et al. [16] describes the synthesis of nanoparticles with a controlled size of coordination polymers with CN ligands (cyano-bridged coordination polymer nanoparticles) comprising hexa- and octametallate building blocks inside hybrid mesoporous silicas, more specifically hybrid mesostructured hexagonal silicas of the SBA-15 and MCM-41 type containing the $-(CH_2)_2C_5H_4N$ functionalities.

The use of the composite material obtained for fixing (binding) cations is not described. Further, the mesoporous silicas have highly insufficient mechanical strength which prevents them from being applied in a column.

It appears that considering the foregoing, there therefore exists a need for a composite solid material fixing (binding) mineral pollutants based on hexacyanoferrates of metals, or more generally cyanometallates of metals which, notably in the case where these mineral pollutants are radioactive compounds such as cesium, may be easily treated, conditioned, stored, in a limited number of steps, after fixing (binding) of these mineral pollutants without any risk of volatilization, of release of these pollutants. There further exists a need for a material which retains these fixed (bound) immobilized mineral pollutants after their binding, and which do not again release, again salt out these immobilized mineral pollutants regardless of the treatment(s) undergone by the composite solid material at the end of the fixing (binding).

This material should further be chemically and mechanically stable so as to be able to be thereby packed in a column in order to allow continuous application.

This composite solid material binding mineral pollutants should also have excellent binding, in particular decontamination, properties.

On the other hand, it would be desirable to have a solid material fixing (binding) mineral pollutants associating good mechanical stability to a high reaction rate contrary to products in compact form, for which the low specific surface area leads to slow reaction rates.

In other words, there exists a need for a solid material fixing (binding) mineral pollutants, based on hexacyanoferrates of metals, or more generally on cyanometallates of metals which i.a. has excellent mechanical and chemical stabilities, a strong affinity or decontamination coefficient, great reactivity, as well as good selectivity and which may be easily treated after fixing (binding) of the pollutants without the latter being released or volatilized.

These properties should be obtained with a minimum amount of mineral fixer (binder) of the metal hexacyanoferrate type, in any case an amount significantly less than that of the composite mineral fixers (binders) of the prior art.

Finally, there exists a need for a material having perfectly reproducible and controlled composition and properties, and for a reliable method with which such a material may be prepared.

The goal of the present invention is therefore to provide a composite solid material binding mineral pollutants based on hexacyanoferrates of metals, or more generally on cyanometallates of metals, which does not have the drawbacks, defects, limitations and disadvantages of composite solid materials fixing (binding) mineral pollutants of the prior art, which overcomes the problems of the materials of the prior art and which i.a. meets the whole of the needs and requirements mentioned above.

SUMMARY OF THE INVENTION

This goal, and further other ones are achieved, according to the invention by a nanocomposite solid material comprising nanoparticles of a metal coordination polymer with CN ligands comprising $M^{n+}$ cations, wherein M is a transition metal and n is 2 or 3; and $[M'(CN)_m]^{x-}$ anions, wherein M' is a transition metal, x is 3 or 4, and m is 6 or 8; said $M^{n+}$ cations of the coordination polymer being bound through an organometallic bond to an organic group of an organic graft chemically attached, fixed, inside the pores of a porous glass support.

Advantageously, $M^{n+}$ may be $Fe^{2+}$, $Ni^{2+}$, $Fe^{3+}$ or $Co^{2+}$.

Advantageously, M' is $Fe^{2+}$ or $Fe^{3+}$ or $Co^{3+}$ and m is 6; or else M' is $Mo^{5+}$ and m is 8.

Advantageously, the anions $[M'(CN)_m]^{x-}$ may be $[Fe(CN)_6]^{3-}$, $[Fe(CN)_6]^{4-}$, $[Co(CN)_6]^{3-}$ or $[Mo(CN)_8]^{3-}$ anions.

Advantageously, the cations may be $Ni^{2+}$, $Fe^{2+}$ or $Fe^{3+}$ cations and the anions are $[Fe(CN)_6]^{3-}$ or $[Fe(CN)_6]^{4-}$ anions.

Advantageously, the cations may be $Fe^{3+}$ cations and the anions may be $[Mo(CN)_8]^{3}$ anions.

Advantageously, the cations may be $Co^{2+}$ or $Ni^{2+}$ and the anions may be $[Co(CN)_6]^{3-}$ anions.

Advantageously, the nanoparticles have the shape of a sphere or spheroid.

The nanoparticles generally have a size, such as a diameter, from 3 nm to 30 nm.

It should be noted that the nanoparticles of the coordination polymer generally have uniform size and shape in the whole support.

Advantageously, the organic group may be selected from nitrogen-containing groups such as pyridine and amines; and the oxygen-containing groups such as acetyl acetonates and carboxylates.

Advantageously, the porous glass pores may be obtained by selective chemical etching of the borate phase of a solid (massive) borosilicate glass, the composition of which is located in the demixing area of the phase diagram $SiO_2$—$Na_2O$—$B_2O_3$.

Advantageously, the support may appear in the form of particles such as beads, fibers, tubes or plates.

Advantageously, the support may appear in the form of particles such as beads and may have a grain size from 10 to 500 μm.

Advantageously, the support may have a specific surface area from 10 to 500 $m^2/g$. Generally herein, this is the BET specific surface area.

Advantageously, the porosity of the porous support is from 25 to 50% by volume. This porosity is generally measured by adsorption of nitrogen.

Advantageously, the support may have one or more types of pore sizes, selected from microporosity, mesoporosity and macroporosity.

Advantageously, the support may have an average pore size from 2 to 120 nm, for example from 2 to 20 nm.

Advantageously, the pores of the support are defined by partitions, walls, the thickness of which is from 10 to 60 nm.

The material according to the invention has a specific structure and composition and may be defined as a nanocomposite solid material comprising nanoparticles of a metal coordination polymer with CN ligands, said nanoparticles being bound through an organometallic bond to an organic group of an organic graft chemically attached inside the pores of a porous glass support.

In other words, the material according to the invention comprises nanoparticles of a coordination polymer with CN ligands (cyano-bridged coordination polymer nanoparticles) based on building blocks, patterns, unit cells, of metal cyanometallates such as hexa- and octa-cyanometallates of metals which are attached, bound to an organic group of a graft, said graft being immobilized, chemically attached, generally by covalence, inside the pores of a porous glass matrix.

It may be stated that the material according to the invention is a material prepared by growing inside the pores of the support, networks with cyano ligands (cyano-bridged networks) in specific points of the latter, this growth being achieved by successive coordination of $M^{n+}$ and then of $[M'(CN)_m]^{x-}$, possibly repeated.

It may further be stated that the polymer is a $M^{n+}/[M'(CN)_m]^{x-}$ polymer.

The polymer is a so-called coordination polymer since it establishes a bond between $M^{n+}$ cations, for example $M^{2+}$ cations, and for example, $M'^{3+}$ cations, via CN ligands: $M^{2+}$-CN-$M'^{3+}$.

The atomic ratio M/M' is generally close to 1.

By «chemically attached» is generally meant that the graft is bound, attached through a covalent bond to the surface of the wall of the pores.

The organic group which may be described as a functional group for anchoring nanoparticles is a group capable of forming an organometallic bond with the $M^{n+}$ cation, such as a pyridine group.

The graft generally comprises a linking group such as a linear alkylene group with 2 to 6 carbon atoms such as a group —$(CH_2)_2$— which links said organic group, also called a functional anchoring group, to a group ensuring chemical attachment, generally by covalence, of the graft to the surface of the pores of the glass support. In the case of a glass for which the surface is essentially composed of silica, this group ensuring covalent attachment of the graft is for example a SiO group bound to the silanol groups of the glass surface.

According to the invention, the cyanometallate of metal such as a hexacyanoferrate of a transition metal is obtained by successive crystallizations and is bound through a strong organometallic bond to the organic group or functional group for anchoring the graft; it then perfectly adheres to the glass support via the graft which is chemically, strongly attached by covalence to this support.

The material according to the invention notably differs from the material described in the document of Folch. B et al. [16] in that the support is made of porous glass and not of mesoporous silica.

The man skilled in the art is aware that a support made of porous glass is totally different from a support made of mesoporous silica and immediately identifies the differences which may exist between the support made of porous glass of the material according to the invention and a support made of mesoporous silica, such as the one which is mentioned in document [16].

A support defined as being a support made of porous glass cannot in any case include supports made of mesoporous silica.

Indeed, the methods for synthesizing a porous glass on the one hand and a mesoporous silica on the other hand are clearly and totally different.

Subsequently, as this is discussed in more detail herein below, the nature of the porosity of a support made of porous glass and of a support made of mesoporous silica is very different.

An essential difference between a porous glass and a mesoporous silica is the fact that the porous glass may easily be shaped into the shape which is desired, whatever this shape, while this is absolutely not possible for mesoporous silica. Mesoporous glass may therefore be given at will the shape of supports having all sorts of geometries and/or sizes and which may be adapted to all kinds of uses. All these advantageous properties due to the support made of porous glass are of course imparted to the material according to the invention comprising this support made of porous glass.

Thus, the material according to the invention, because it includes a support made of porous glass has mechanical strength which is clearly greater which allows its use in a column, which is not possible with the material of document [16].

Indeed, the support made of porous glass of the material according to the invention generally has partitions, walls, with significant thicknesses, for example from 10 to 60 nm, as defined above; therefore it may advantageously be defined as a material which has high mechanical strength and which may therefore be shaped into beads for use in a column, unlike the silicas obtained via a sol-gel route of the Folch document [16] which have partitions, walls of small thickness, for example from 2 to 3 nm.

Additionally, the material according to the invention generally has a non-organized porosity in the sense that several types of pore sizes may be present simultaneously, while in the material of document [16], the silica support has a well organized porosity with pore sizes always below 10 nm.

Such a non-organized porosity would be a priori more advantageous for diffusion of the pollutant ions inside the porosity during sorption, notably because of the presence of a few macropores.

Accordingly, this non-organized porosity would increase kinetics.

The material according to the invention does not have the drawbacks of the materials of the prior art, meets the requirements listed above and provides a solution to the problems posed by the materials of the prior art.

Thus, in the material according to the invention, there is no free metal cyanometallate such as a transition metal hexacyanoferrate within the porosity which may be salted out during the treatment of a solution with view to removing the mineral pollutants therefrom.

One of the most important properties of the material according to the invention, which is totally surprising with regard to the prior art, is that after sorption of a mineral pollutant, such as radioactive cesium, within the polymer nanoparticles, itself bound to an organic graft chemically attached to the surface of the pores of the support, the porosity of the material according to the invention may easily be closed without this producing any release, volatilization of the pollutant such as cesium. Closing the porosity notably because the support is made of a porous glass, preferably selected for its capability of having its porosity easily closed under « mild» conditions, and not made of silica, may actually be achieved by a treatment under « mild » conditions, for example by a heat treatment at a low temperature or by a radiative treatment, or further by a chemical treatment preferably in a basic atmosphere, for example an ammonia containing atmosphere, without any risk of releasing, notably volatilizing, the mineral pollutant, for example cesium.

The possibility of easily closing the porosity of the glass with a treatment as described above, for example with a heating treatment, is one of the fundamental advantages of the method according to the invention. In the case of a material comprising a support made of mesoporous silica such as the material described in document [16], it is not possible to close the porosity, at least not so easily.

Once the porosity is closed, the material according to the invention may be directly used as a confinement matrix, which was impossible with the materials of the prior art such as the material of document [16].

Thus, the material according to the invention generally comprises an amount of attached metal cyanometallate, for example of attached metal hexacyanoferrate from 1 to 10% by weight, preferably from 2 to 3% by weight based on the mass of the support, this value should be compared with the 30% value for hexacyanoferrates impregnated on silica of the prior art.

The invention further relates to a method for preparing the material described above in which the following successive steps are performed:

a) a support made of porous glass is prepared;

b) chemical attachment of the organic graft inside the pores of the support made of porous glass is achieved;

c) the support made of porous glass, inside the pores of which the organic graft is attached, is brought into contact with a solution containing the $M^{n+}$ ion, and then the thereby obtained support is washed one or several times and dried;

d) the support made of porous glass obtained at the end of step c) is brought into contact with a solution of a complex of $[M'(CN)_m]^{x-}$, and then the thereby obtained support is washed one or several times and dried;

e) the support made of porous glass obtained at the end of step d) is washed one or several times, and then dried;

f) steps c) to e) are optionally repeated.

Advantageously, during step a), the support made of porous glass may be prepared by selective chemical etching of the borate phase of a solid (massive) sodium borosilicate glass, the composition of which is located in the demixing area of the phase diagram $SiO_2$—$Na_2O$—$B_2O_3$.

Advantageously, before the chemical etching, the solid (massive) sodium borosilicate glass may be heat-treated.

Advantageously, the chemical etching may comprise etching with an acid solution such as a solution of hydrochloric acid, possibly followed by etching with a basic solution, such as a soda solution.

Advantageously, the organic graft may be pyridine and the chemical attachment of the organic graft to the interior of the pores of the support made of porous glass may be achieved by bringing the support made of porous glass in contact with a solution, such as a solution in methanol, of $(CH_3O)Si(CH_2)_2C_5H_4N$.

Advantageously, the solution containing the $M''^+$ ion may be a solution, such as a solution in methanol, of $[M(H_2O)_6]Cl_2$ or $[M(H_2O)_6]Cl_3$.

Advantageously, the complex of $[M'(CN)_m]^{x-}$ fits the following formula:

$(Cat)_x[M'(CN)_m]$, wherein M', m, and x have the meaning already given above and Cat is a cation generally selected from cations of alkaline metals such as K or Na, quaternary ammoniums such as tetrabutylammonium (TBA), and phosphoniums such as tetraphenylphosphonium ($PPh_4$).

Advantageously, steps c) to e) may be repeated from once to four times.

To summarize, this method is simple, resorts to known and proven processes, is reliable and perfectly reproducible, i.e. it allows the preparation of a final product for which the characteristics, the composition and the properties are perfectly determined and are not subject to random variations.

The invention also relates to a method for fixing at least one mineral pollutant contained in a solution, in which said solution is brought into contact with the nanocomposite solid material as described above, by means of which the mineral pollutant is immobilized inside the pores of the solid material.

Advantageously, said solution may be an aqueous solution.

Said solution may be a process liquid or an industrial effluent.

Advantageously, said solution may be selected from liquids and effluents from nuclear industry and nuclear installations and from activities applying radionuclides.

Advantageously, the method may be carried out continuously.

Advantageously, the composite solid material fixing (binding) mineral pollutants may be packed in a column.

Generally, said pollutant may be present at a concentration from 0.1 picogram to 100 mg/L.

Said pollutant may stem from a metal or from a radioactive isotope of said metal.

Said pollutant may be selected from anionic complexes, colloids and cations.

Said pollutant may notably be an element selected from Cs, Co, Ag, Ru, Fe and Tl and isotopes thereof.

Advantageously, after the contacting, the solid material in the pores of which the mineral pollutant is immobilized, is subjected to a treatment for closing the pores.

Advantageously, the treatment for closing the pores is a heat treatment carried out at a temperature below 1,000° C., for example from 600 to 850° C. for a duration for example from 5 to 30 minutes; or a generally low energy radiative treatment, for example carried out by bombardment with Kr or Ar or Xe ions, for example under the following conditions: 70 MeV Ar or 250 MeV Kr, with a fluence from $2\times10^{10}$ to $10\times10^{10}$ ions/cm$^2$.s; or further a chemical treatment generally carried out in a basic atmosphere, such as for example an ammonia containing atmosphere, generally carried out at room temperature, for a duration, for example from 1 to 12 hours.

This fixing (binding) method has all the advantages intrinsically related to the solid material according to the invention, applied in this method and which have already been described above.

The scale of the right ordinates relates to the measurements illustrated by □.

The scale of the left ordinates relates to the measurements illustrated by ■, ○ and ●.

The samples are samples of porous glass prepared from the composition of Example 1 which has undergone heat treatments (TT) and chemical etchings (TC) under different conditions.

The measurements illustrated by ■ were conducted on a sample which has not been subjected to any heat treatment and which has undergone chemical etching with 0.5M HCl for 6 hours at 90° C.

The measurements illustrated by ○ were conducted on a sample which has not been subject to any heat treatment, and which has undergone chemical etching with 0.5M HCl for 24 hours at 90° C.

The measurements illustrated by ● were conducted on a sample which has been subjected to heat treatment for 25 hours at 540° C., and which has undergone chemical etching with 0.5M HCl for 6 hours at 90° C.

The measurements illustrated by □ were conducted on a sample which did not undergo any heat treatment and which has undergone chemical etching with 0.5M HCl for 6 hours at 90° C. followed by chemical etching with 1M NaOH for one hour at room temperature.

Figure 3:
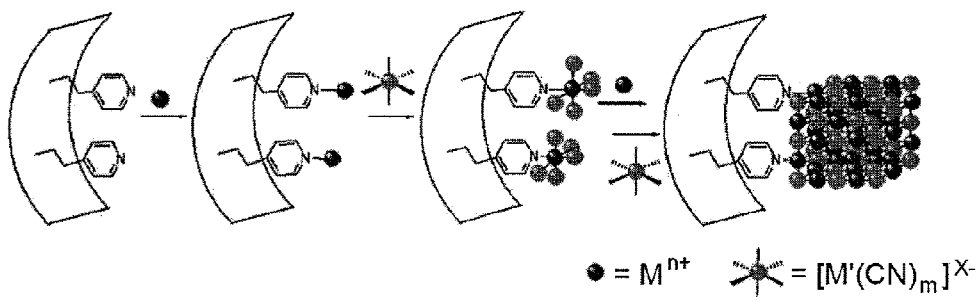

FIG. 3 is a schematic illustration of the method according to the invention carried out with $-(CH_2)_2C_5H_4N$ grafts.

Figure 4:
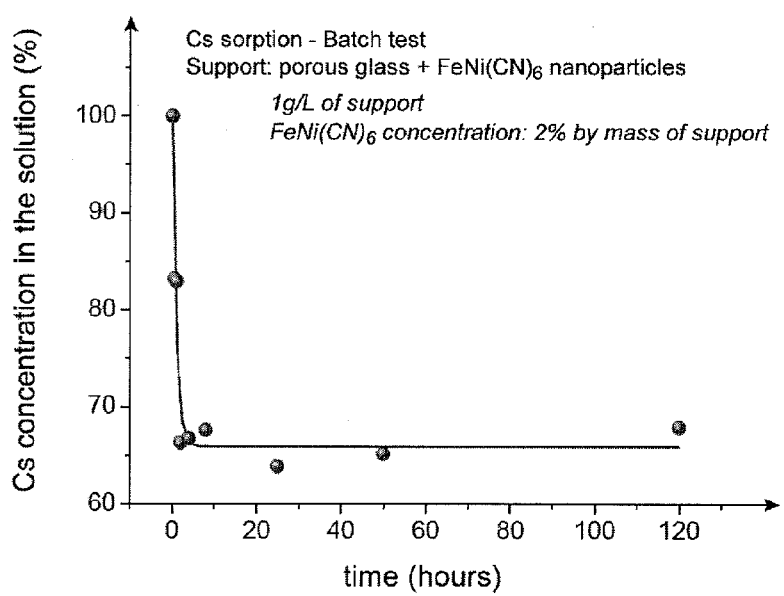

FIG. 4 is a graph which shows the Cs sorption kinetics tests conducted batchwise with the material of Example 2, i.e. a nanocomposite material with a support made of porous glass and nanoparticles of $FeNi(CN)_6$. The concentration of $FeNi(CN)_6$ is 2% based on the mass of the support and 1 g of material/L of solution is used.

The Cs concentration in the solution is plotted in ordinates (in % relatively to the initial concentration) and the time (hours) is plotted in abscissa.

DETAILED DESCRIPTION OF THE INVENTION AND PREFERRED EMBODIMENTS

The invention will now be described in more detail in the following, particularly by referring to the preparation method.

The first step of this method consists in preparing a support made of porous glass.

First of all let us specify that the term of « porous» as used herein in connection with a support, means that this support contains pores or voids.

Accordingly, the density of this porous support is less than the theoretical density of the non-porous support which is described as a solid material.

The pores may be connected or isolated but in the porous support according to the invention, the majority of the pores are connected and in communication. One then refers to open porosity or interconnected pores.

Generally, in the support made of porous glass of the invention, the pores are percolating pores which connect a first surface of said support to a second main surface of said support.

In the sense of the invention, a support is generally considered as porous when its density is at most about 95% of its theoretical density.

Preferably, this support made of porous glass is a support which is prepared by chemical etching of a starting solid (massive) sodium borosilicate glass, the composition of which is located in the demixing area of the phase diagram $SiO_2$—$Na_2O$—$B_2O_3$.

This composition is given in all the thermodynamic tables of glasses and may therefore be determined by the man skilled in the art, very easily and very rapidly.

Figure 1:
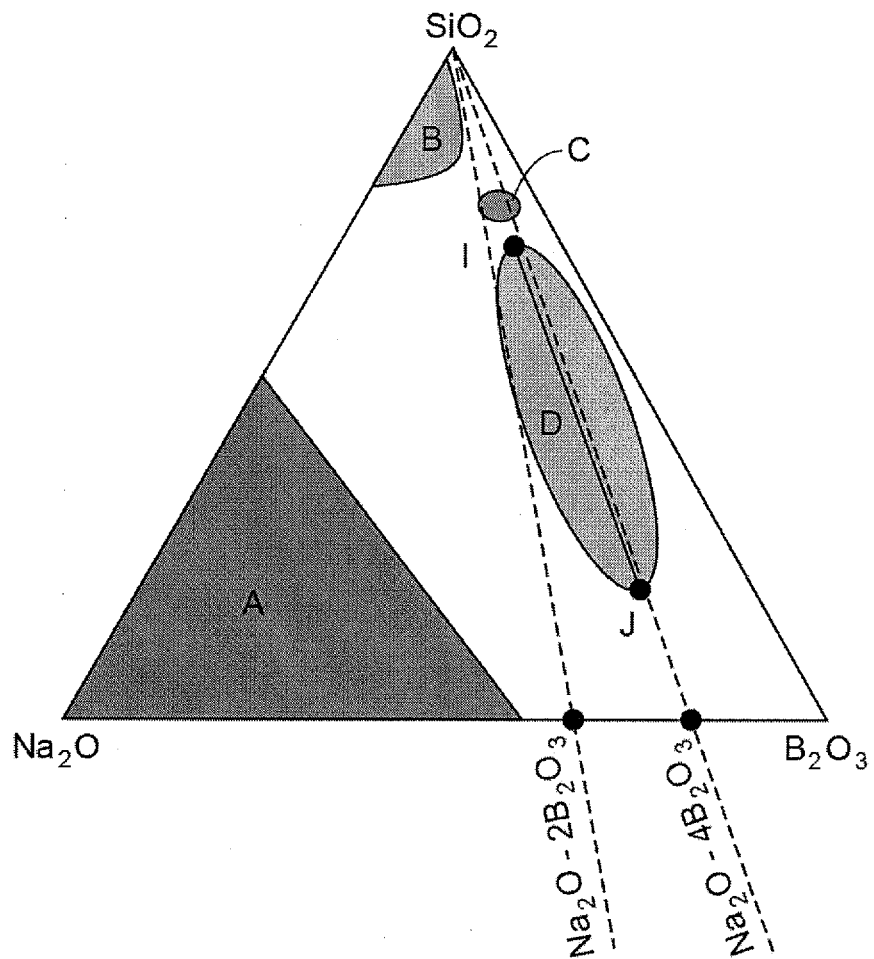
FIG. 1 shows the phase diagram $SiO_2Na_2O$—$B_2O_3$ and the demixing areas of this diagram.

Reference may for example be made to the diagram of FIG. 1, an excerpt from Techniques de l'ingénieur, Jul. 10, 2001, part Verres AF3600, written by Jean PHALIPPOU.

On this diagram, the demixing areas are the areas B and D and the area D is preferably adopted according to the invention.

By « solid (massive) glass» is meant that this starting glass has no or almost no porosity and that this porosity is specifically generated by the chemical etching.

The elaboration of this glass is generally carried out first of all by weighing powders of oxides or oxide precursors such as carbonates in the intended proportions with which it will be possible to obtain a glass having the sought composition, in the case of a borosilicate glass located in the demixing area of the phase diagram $SiO_2$—$Na_2O$—$B_2O_3$. The composition of the glass is also generally selected so that the porosity of the substrate made of porous glass may be easily closed without affecting its mechanical and chemical properties and without applying high temperatures.

These powders are then mixed intimately, and the mixture of the powders is placed in a crucible for example made of a rhodium platinum alloy which is positioned in an adequate heating device such as a muffle furnace.

The melting of the mixture of powders in order to obtain the molten glass is generally carried out at a temperature, a so-called glass elaboration temperature which is generally located in the range from 1,300° C. to 1,550° C. This elaboration temperature is generally attained by performing several temperature-raising ramps from room temperature, and by observing temperature plateaus of variable duration between these ramps. The final plateau at the elaboration temperature, for example 1,480° C., may have a duration from 1 to 4 hours, for example 2 hours.

Generally, the molten glass is then cast for example onto a plate, cooled down to its solidification and then crushed. The crushed glass pieces are then again placed in the crucible and then again melted by bringing them to the elaboration temperature as defined above. Generally, the crucible containing the crushed glass pieces is directly introduced into the furnace already brought to the elaboration temperature and this temperature is maintained, for example at 1,480° C., for a sufficient time, generally from 10 to 60 minutes, for example 30 minutes, so that the molten glass is homogeneous.

The molten glass is then again cast, for example on a plate, or cast into a mold if a specific shape is desired, and then cooled down until its solidification.

Optionally, when the glass has been cast on a plate, it is then possible to give it the desired shape, for example, the glass may be again crushed and optionally milled more finely for example by means of a vibratory mill if it is desired to prepare a powder with a finer grain size.

The support made of glass may assume all kinds of shapes.

The support may thus appear in the form of particles such as spheres (beads), fibers, tubes, or plates.

The size of the support may also vary between wide limits.

Advantageously, the support may appear in the form of particles forming a powder and may have a grain size (particle size) from 10 to 500 μm. The size of the particles is defined by their largest dimension which is their diameter in the case of spheres or spheroids.

The method for elaborating the glass, described above may easily be adapted according to the shape and/or the size of the glass support, the preparation of which is desired.

Following the elaboration of the glass and prior to chemical etching, the glass may optionally undergo one or more heat treatments with variable temperatures and durations.

These heat treatment(s) may be carried out before and/or after crushing. Thus, if it is desired to keep the integrity of the shape of the glass, the heat treatment(s) is (are) carried out before crushing otherwise it (they) is (are) carried out after this crushing, the heat treatment time(s) are then different. It is also possible to carry out one or more heat treatment(s) before crushing, and one or more heat treatment(s) after crushing.

This (these) heat treatment(s) has (have) the purpose of enlarging the borate areas and therefore varying the size and morphology of the pores in the final porous glass.

This (these) heat treatment(s) is (are) generally carried out at a temperature which is the growth temperature of the demixed areas and which is generally located between the glass transition temperature (Tg) and the glass transition temperature +350° C. at most. The duration(s) of this (these) heat treatment(s) is (are) very variable and may range up to several days depending on the treatment temperature.

Thus, the heat treatment(s) may be carried out at a temperature between Tg and Tg+350° C. for a duration from 6 to 96 hours.

After this(these) optional heat treatment(s), chemical etching is carried out which is necessary for obtaining porosity inside the glass.

Chemical etching generally comprises etching with an acid solution, such as a solution of hydrochloric acid, for example at a concentration of 0.5 mol/L, optionally followed by etching with a basic solution, such as a soda solution at a concentration of 1 mol/L.

The acid etching generally has a duration from 2 to 48 hours, for example from 6 hours to 24 hours, and is generally carried out at a temperature from 50 to 120° C., for example 90° C.

The optional basic etching generally has a duration from 1 to 3 hours, for example 1 hour, and is generally carried out at room temperature.

Generally, the thereby elaborated porous support is washed, for example with ultra-pure water, once or several times, and then dried for example in an oven at a temperature of 120° C. for 24 hours.

The support may have a specific surface area from 10 to 500 m$^2$/g, preferably from 50 to 150 m$^2$/g as measured by BET.

The porosity of the support may also vary within wide limits, generally from 25 to 50%.

The support prepared by the method according to the invention may only have a single type of porosity, for example microporosity, mesoporosity or macroporosity.

Or else, the support prepared by the method according to the invention may simultaneously have several types of porosities selected for example from microporosity (a pore size, for example diameter, generally less than 2 nm), mesoporosity (a pore size, for example diameter, from 2 to 20 nm), and macroporosity (a pore size, for example diameter, of more than 20 nm, for example up to 100 nm).

The average pore size, which is their average diameter in the case of pores with a circular section, generally ranges from 2 to 120 nm.

The porosity and the pore size may be varied and it may be perfectly controlled by modifying the conditions of the optional heat treatments and of the chemical etching(s).

Figure 2:
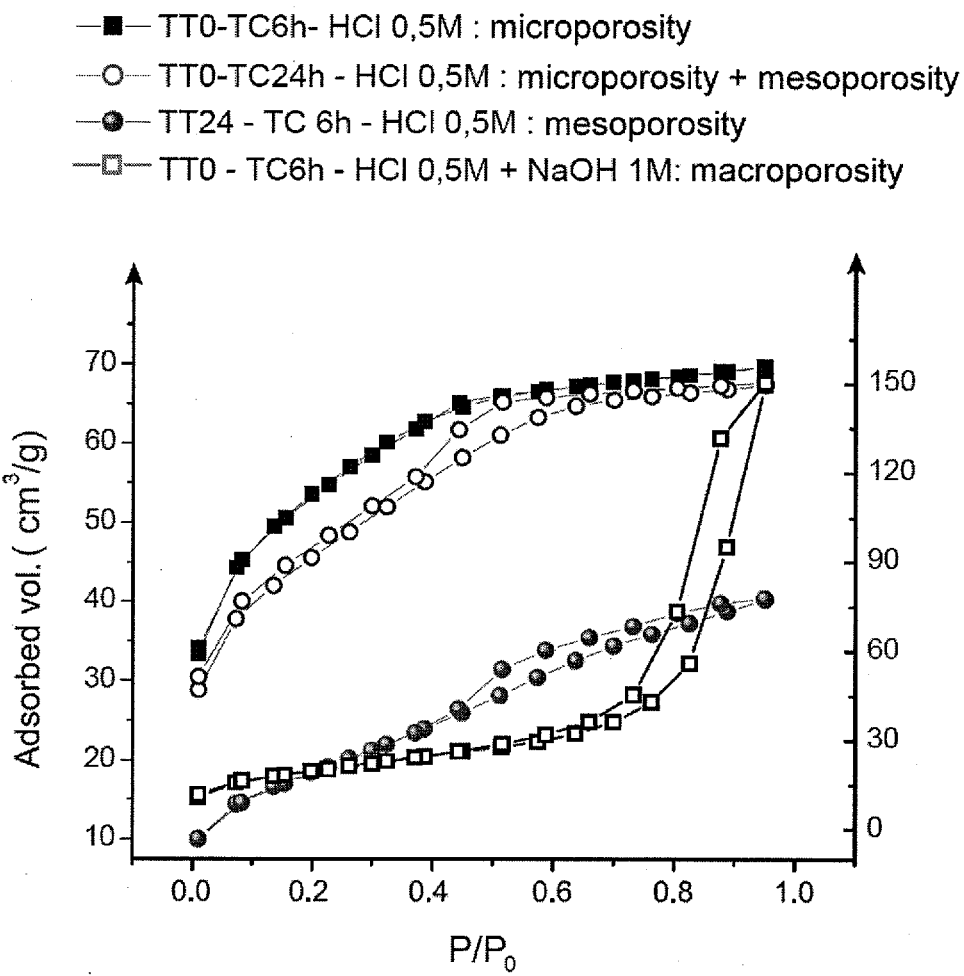
FIG. 2 is a graph which illustrates the adsorbed nitrogen volume $V_0$ (in cm$^3$/g) versus $P/P_0$ wherein P is the partial pressure of nitrogen and $P_0$ is the maximum adsorbed pressure, during the measurement of porosity with a BET apparatus.

Thus, as shown in FIG. 2, the heat treatment and chemical etching conditions may lead to very different porosities. Are thus observed:

microporosity for example for a sample without any heat treatment and having been subjected to 6 hour etching in 0.5M HCl at 90° C. (specific surface area of 164 m$^2$/g).

microporosity and mesoporosity for example for a sample without any heat treatment and having been subjected to 24 hour etching in 0.5 M HCl at 90° C. (specific surface area of 146 m$^2$/g).

mesoporosity for example for a sample with a 24 hour heat treatment at 540° C. followed by 6 hour chemical etching in 0.5 M HCl at 90° C. (sample of Example 1, specific surface area of 65 m$^2$/g).

macroporosity for example for a sample without any heat treatment with 6 hour chemical etching in 0.5 M HCl at 90° C. followed by basic etching in 1M NaOH for 1 hour at room temperature (specific surface area of 69 m$^2$/g).

The support made of porous glass according to the invention has pore walls which may be described as « thick », i.e. generally with a thickness from 10 to 60 nm, which is much higher than the partitions, walls of the pores of mesoporous silicas of document (2 to 3 nm) and greatly increases the mechanical strength.

The steps which will now be described for chemical attachment of the organic graft and for preparing nanoparticles of a coordination polymer with CN ligands bound to these grafts inside the pores of the support are substantially similar to those of the method described in the Folch et al. document [16] however with the difference that in that document, the porous support is made of mesoporous silica and not made of glass. Reference may therefore be made to that document as regards notably the reagents and operating conditions applied in these steps but also for the description of the nanoparticles and of their attachment to the surface of the pores via the graft.

Chemical attachment of the organic graft is then achieved inside the pores of the support made of porous glass. This step may also be called functionalization step (see FIG. 3).

The organic graft comprises an organic group which may be designated as a functional group for anchoring nanoparticles.

A functional group for anchoring nanoparticles is a group capable of forming an organometallic bond with the cation $M^{n+}$ Examples of such organic groups have already been mentioned above. A preferred organic group is pyridine as this is illustrated in FIG. 3.

The organic group may be directly bound to the support made of porous glass, but it is generally chemically bound, fixed, attached to this support via an arm, linking group and an attachment group chemically attached, fixed, bound, generally through a covalent bond to the support made of porous glass.

The graft thus generally comprises a linking group such as a linear alkylene group with 2 to 6 carbon atoms such as a group —(CH$_2$)$_2$— (see FIG. 3) which links, connects, said organic group, also called a functional anchoring group, to a group ensuring covalent attachment of the graft to the surface of the pores of the glass support. In the case of a glass, the surface of which is essentially composed of silica, this group ensuring the covalent attachment of the graft is for example an SiO group bound to silanol groups of the surface of the glass.

In order to obtain attachment, fixing, of the graft to the surface of the walls of the pores of the support made of porous glass, this support is therefore brought into contact with a compound comprising said functional anchoring group, an attachment group capable of chemically binding, generally by covalence, to the surface of the glass and optionally a linking group connecting, linking, said functional anchoring group to the attachment group ensuring attachment, generally by covalence, of the graft to the surface of the walls of the pores.

This attachment group may be selected for example from trialkoxysilane groups which react with silanol groups which may be present at the surface of the glass.

Thus, in the case of pyridine, the support in porous glass may be brought into contact with a solution of (CH$_3$O)$_3$Si(CH$_2$)$_2$C$_5$H$_4$N in a solvent. A preferred solvent is toluene. The solvent is generally refluxed and the duration of the contacting is generally from 12 to 48 hours, for example 24 hours.

At the end of this step, a support made of porous glass functionalized by organic groups such as pyridine groups (see FIG. 3) is therefore obtained.

It is then proceeded with the growth of nanoparticles of a metal coordination polymer with CN ligands inside the pores of the support made of porous glass.

This growth is carried out in two successive steps, optionally repeated.

One begins by bringing into contact the support made of porous glass, inside the pores of which is attached the organic graft, with a solution containing the $M^{n+}$ ion, generally in the form of a metal salt.

This solution is a solution in a solvent generally selected from water, alcohols and mixtures of water and of one or several alcohols.

The preferred solvent is methanol.

The metal salt contained in the solution is a salt, the metal of which is generally selected from metals capable of giving a cyanometallate of this metal, such as a hexacyanoferrate of this metal, which is insoluble.

This metal may be selected from all transition metals, for example from copper, cobalt, zinc, cadmium, nickel and iron etc.

Nickel, iron and cobalt are preferred and the $M^{n+}$ ion may therefore be selected from Fe$^{2+}$, Ni$^{2+}$, Fe$^{3+}$, and Co$^{2+}$.

The metal salt may for example be a nitrate, a sulfate, a chloride, an acetate, optionally hydrated, of one of these metals at a concentration in the solution preferably from 0.01 to 1 mol/L, still preferably from 0.02 to 0.05 mol/L.

Moreover the amount of salt used is preferably about 0.4 mmol/g of treated support.

Advantageously, the solution containing the $M^{n+}$ ion may be a solution in water or in an alcohol such as methanol, or a solution in a mixture of water and of one or several alcohol(s).

Advantageously, this solution containing the $M^{n+}$ ion may be a solution such as a solution in methanol of [M(H$_2$O)$_6$]Cl$_2$ wherein M is preferably Ni, Fe or Co, or of [M(H$_2$O)$_6$]Cl$_3$ wherein M is Fe.

The contacting (bringing into contact) which may also be described as impregnation of the support, is generally carried out at room temperature, preferably with stirring, and its duration is generally from 20 to 24 hours.

At the end of this contacting, a solid support is obtained, in which $M^{n+}$ cations are bound through an organometallic bond to the functional anchoring groups of the graft. Thus, in the case of pyridine (see FIG. 3) a bond is established between the nitrogen of the ring and the $M^{n+}$ cation. The obtained solid product is then separated for example as a powder, for example by filtration.

The separated product is then washed one or several times, for example 1 to 3 times preferably with the same solvent as the solvent of the $M^{n+}$ solution, such as methanol.

With this washing operation it is possible to remove the excess metal salt and obtain a stable product with a perfectly defined composition.

A drying step is then carried out generally at room temperature and in vacuo for a duration from 6 to 48 hours, for example 24 hours. Generally, the drying is continued until the mass of the support remains substantially constant.

The support made of porous glass which has reacted with the metal cation $M^{n+}$ as described above is then brought into contact with a solution of a complex (which may optionally be called a salt) of $[M'(CN)_m]^{x-}$, for example $[M'(CN)_m]^{3-}$.

This solution is a solution in a solvent selected from water, alcohols and mixtures of water and of one of several alcohol(s).

The preferred solvent is methanol.

The contacting which may also be described as an impregnation of the support, is generally carried out at room temperature, preferably with stirring, and its duration is generally from 20 to 48 hours, for example 24 hours.

This complex generally fits the following formula:

$(Cat)_x[M'(CN)_m]$, wherein M', m, and x have the meaning already given above and Cat is a cation generally selected from cations of alkaline metals such as K or Na, quaternary ammoniums such as tetrabutylammonium (TBA), and phosphoniums such as tetraphenylphosphonium ($PPh_4$). Preferred complexes are the complexes of formula $[N(C_4H_9)_4]_x[M'(CN)_m]$.

Still preferred complexes are the complexes of formula $[N(C_4H_9)_4]_3[M'(CN)_m]$ such as $[N(C_4H_9)_4]_3[Fe(CN)_6]$, $[N(C_4H_9)_4]_3[Mo(CN)_8]$, and $[N(C_4H_9)_4]_3[Co(CN)_6]$.

The solution, for example the methanolic solution of complex or salt is applied at a variable concentration, i.e. the concentration of the salt or complex is generally from 0.01 to 1 mol/L, preferably from 0.02 to 0.05 mol/L.

On the other hand, the solution of the salt or complex of $[M'(CN)_m]^{x-}$ applied is prepared so that the mass ratio of the salt or complex to the amount of the impregnation support essentially consisting of the initial support made of porous glass, is preferably from 5 to 20%.

Attachment, fixing, of the anionic portion $[M'(CN)_m]^{x-}$, for example $[Fe(CN)_6]^{4-}$, of the salt or complex is thereby obtained on the $M^{n+}$ cations (See FIG. 3), this attachment is accomplished by forming bonds of the covalent type which are relatively strong depending on the medium, and this attachment, fixing, is generally quantitative, i.e. all the $M^{n+}$ cations react. The binding therefore does not have any randomness.

At the end of this contacting, the obtained solid product is separated for example as a powder, for example by filtration.

The separated product is then washed one or several times, for example 1 to 3 times preferably with the same solvent as the solvent of the salt or complex solution, such as methanol.

This washing operation has the purpose of removing the salts and complexes of $[M'(CN)_m]^{x-}$ which have not been bound to the $M^{n+}$ cations and gives the possibility of obtaining a nanocomposite material fixing (binding) mineral pollutants in which there is no longer any free, non-bound $[M'(CN)_m]^{x-}$ which may salted out.

The steps for contacting the support in porous glass with the metal cation $M^{n+}$ and then of contacting the support made of porous glass with a solution of a salt or a complex of $[M'(CN)_m]^{x-}$, for example $[M'(CN)_m]^{3-}$, may only be carried out once, or else they may be repeated 1 to 4 times (see FIG. 3), in this way it is possible to perfectly adjust the size of the nanoparticles.

The weight content of mineral fixer (binder), i.e. of insoluble metal hexacyanoferrate fixed (bound) on the anion exchanger polymer, is generally from 1 to 10%, for example 3%, based on the mass of the support made of porous glass.

The nanocomposite solid material fixing (binding) mineral pollutants according to the invention may notably be applied but not exclusively in a method for fixing (binding) at least one mineral pollutant for example a metal cation contained in a solution, in which said solution is brought into contact with said composite solid material fixing (binding) mineral pollutants.

The materials according to the invention, because of their excellent properties such as an excellent exchange capacity, excellent selectivity, high reaction rate, are particularly suitable for such a use.

This excellent efficiency is obtained with reduced amounts of mineral fixer (binder) such as insoluble hexacyanoferrate.

Further, the excellent mechanical strength and stability properties of the material according to the invention, resulting from its specific structure allow it to be packed in a column and the fixing (binding) process to be continuously applied, for example in a fluidized bed, which may thus be easily integrated into an existing facility, for example in a processing chain or line comprising several steps.

The solutions which may be treated with the method of the invention and with the composite solid material fixing (binding) mineral pollutants according to the invention are very varied, and may even for example contain corrosive acids, agents, or other agents because of the excellent chemical stability of the material according to the invention.

The material according to the invention may in particular be used over a very wide pH range. For example it is possible to treat nitric aqueous solutions with a concentration ranging for example from 0.1 to 3M, acid or neutral solutions up to a pH of 8, etc. The mineral pollutant which may be fixed (bound) in the method according to the invention may be any mineral pollutant, i.e. for example any pollutant stemming from (based on) a metal or an isotope, preferably a radioactive isotope of this metal, which may be found in the solution.

This pollutant is preferably selected from anionic complexes, colloids, cations and mixtures thereof.

Preferably this is a pollutant, such as a cation from an element selected from Tl, Fe, Cs, Co, Ru, Ag, . . . and isotopes, in particular radioactive isotopes thereof, among which mention may be made of $^{58}Co$, $^{60}Co$, $^{55-59}Fe$, $^{134}Cs$, $^{137}Cs$, $^{103,105,106,107}Ru$. The metal cation is in particular the cesium cation $Cs^+$ or the thallium cation $Tl^{2+}$.

The anionic complex is for example $RuO_4^{2-}$.

A preferred use of the material according to the invention is the fixing (binding) of the cesium which contributes for a large part to the gamma activity of liquids of the nuclear industry and which is selectively fixed (bound) by hexacyanoferrates.

The concentration of the pollutant(s) such as cation(s) may vary between wide limits: for example, it may be for each of the latter from 0.1 picogram to 100 mg/L, preferably from 0.01 mg/L to 10 µg/L.

The solution to be treated by the method of the invention is preferably an aqueous solution, which, in addition to the pollutant(s) such as cation(s) to be fixed (bound), may contain other salts in solution such as $NaNO_3$ or $LiNO_3$ or further $Al(NO_3)_3$ or any other soluble salt of an alkaline or earth alkaline metal at a concentration which may attain 2 mol/L. The solution may also contain, as indicated above, acids, bases and even organic compounds.

The solution to be treated may also be a solution in a pure organic solvent such as ethanol (absolute alcohol) acetone or other solvent, in a mixture of these organic solvents, or in a mixture of water and of one or more of these organic solvents which are miscible with water.

The material according to the invention thus has the advantage of being able of treating solutions which cannot be treated with organic resins.

This solution may consist in a process liquid or in an industrial effluent or in any other solution which may in particular stem from nuclear installations and industry or from any other activity related to the nuclear industry.

Among the various liquids and effluents of the nuclear industry, nuclear installations and activities applying radionuclides which may be treated by the method of the invention, for example mention may be made of the waters for cooling power stations, and of all the various effluents coming into contact with radio-isotopes such as all the washing waters, solutions for regenerating resins, etc.

It is however obvious that the method according to the invention may also be applied in other non nuclear fields of activities, such as industrial fields or other fields.

Thus, hexacyanoferrates selectively fix (bind) thallium and this property may be exploited in the purification of cementwork effluents in order to reduce or suppress discharges and emissions of this element which is a violent poison.

It was seen that the fixing (binding) method according to the invention is preferably applied continuously, the nanocomposite material according to the invention, preferably in the form of particles, then being packed for example in the form of a column, the material preferably forming a fluidized bed, the fluidization of which is ensured by the solution to be treated, but the fixing (binding) method may also be applied batchwise, in a batch mode, the contacting of the exchange material and of the solution to be treated then being preferably achieved with stirring. The packing of the material in a column allows continuous treatment of significant amounts of solution, with a high flow rate of the latter.

The contacting time of the solution to be treated with the material according to the invention, is variable and may for example range from 1 minute to 1 hour for continuous operation and, for example from 10 minutes to 25 hours preferably from 10 minutes to 24 hours for batch operation.

At the end of the fixing (binding) process, the pollutants found in the solution, such as cations, are immobilized in the fixing (binding) nanocomposite solid material (exchanger) according to the invention by sorption i.e. by ion exchange or adsorption inside the nanoparticles, inside the structure of the nanoparticles, themselves chemically bound to the surface of the walls of the pores of the glass support.

The porosity of the material according to the invention, because it consists essentially of glass may be easily closed with a treatment carried out under « mild» conditions, i.e. which do not cause any modification of its mechanical and chemical properties and especially no release, no salting-out of the immobilized pollutant such as cesium, by volatilization of the latter.

This treatment which allows the pores of the material according to the invention to be closed, in which the pollutants are trapped, may be carried out by applying an external stress to the material which may be a thermal, radiative, chemical or other stress.

In the case when a heat treatment is carried out, the latter is carried out at a low temperature, i.e. generally at a temperature below 1,000° C., for example from 600 to 850° C., notably 800° C., for a duration for example from 5 to 30 minutes, for example 6 minutes. Such a treatment is carried out at a temperature which is well below the temperatures applied for vitrification of the porous supports notably made of silica of the prior art which causes volatilization of the pollutants such as cesium. According to the invention, this heat treatment does not cause vitrification of the support but simply closure of the pores of the latter which is demonstrated by the decrease in the specific surface area.

In the case when a treatment is carried out by irradiation of the substrate, the latter is generally a low energy treatment for example achieved by bombardment with Ar, Kr or Xe ions, for example under the following conditions: 70 MeV Ar or 250 MeV Kr, with a fluence from $2 \times 10^{10}$ to $10 \times 10^{10}$ ions/cm².s.

In the case when the closure of the porosity is accomplished with a chemical treatment, a basic atmosphere is generally used such as for example an ammonia containing atmosphere, generally at room temperature for a duration for example from 1 to several hours, preferably from 1 to 12 hours.

The nanocomposite solid material according to the invention, the porosity of which has been closed, may be directly stored, since its very great mechanical and chemical stabilities and its essentially mineral nature allow such storage without there occurring any degradation of the product leading to emanations of hydrogen.

However it may possibly be necessary in certain cases to conduct lixiviation tests.

In the solid material according to the invention, the porosity of which has been closed, it may be stated that one has an encapsulation of the pollutant such as Cs in a glass.

The material according to the invention may therefore be used directly, with a simple treatment for closing the pores, as a confinement matrix, in a safe and reliable way, without any risk of salting out, release of the immobilized pollutant, such as cesium, which was impossible with the materials of the prior art which require for confinement, treatments, for example vitrification, carried out at a high temperature, causing release of the pollutants, in particular cesium by volatilization.

The material according to the invention, and the fixing (binding) method applying it provides a solution to one of the essential unsolved problems which all the materials and methods of the prior art have, whether they are notably solid or composite.

The invention will now be described with reference to the following examples, given as an illustration and not as a limitation.

In the Examples 1 to 4 which follow, powders of porous glasses were first synthesized by controlled demixing (Example 1) and then by chemical etching; and then grafting and growth of nickel ferrocyanide particles were carried out in these porous glasses (Example 2).

Tests for extracting cesium from a solution rich in sodium nitrate were then conducted by using the thereby obtained powders (Example 3).

Finally, tests for closing the porosity of these powders in order to convert them into a solid material used as a matrix for the packaging of the thereby trapped Cs were carried out (Example 4).

The operating mode for these 4 steps is the following:

Example 1: Synthesis of Porous Glasses

The composition of the initial glass is $SiO_2$ 75 mol %; $Na_2O$ 5 mol %; $B_2O_3$ 20 mol %. The precursors used are commercial powders of $SiO_2$ (Sifraco®), $Na_2CO_3$ (Prolabo®) and $H_3BO_3$ (Prolabo®), respectively.

In order to obtain a batch of 100 g of glass, it is proceeded with weighing 72.58 g of $SiO_2$ powder, 8.53 g of $Na_2CO_3$ powder and 39.86 g of $H_3BO_3$ powder. The silica and the sodium carbonate are heated beforehand to a temperature of 250° C., in order to remove any residual trace of water.

After this weighing, these powders are mixed intimately and then placed in a rhodium platinum crucible and placed in a muffle furnace.

In order to achieve the synthesis of the glass, first of all a first heat treatment is carried out according to the following cycle:
- a rise in temperature at a rate of 100° C./h is carried out from room temperature up to 150° C., and then a plateau of 2 hours at this temperature is observed;
- a temperature ramp at a rate of 50° C./h is carried out up to 300° C., and then a plateau of 2 hours at this temperature is observed;
- a temperature ramp at a rate of 150° C./h is carried out up to 1,200° C., and then another temperature ramp of 400° C./h is carried out up to 1,480° C., and a one hour plateau is observed at this temperature.

At the end of this first heat treatment, the molten glass is cast on a plate and then crushed with a hammer.

The crushed glass pieces are then put back into the crucible and directly introduced into the furnace brought to 1,480° C., this temperature is maintained for 30 minutes for good homogenization.

Finally, the molten glass is again cast onto a plate, crushed with a hammer and finely milled by means of a vibratory mill.

The obtained powder has grains with a size of less than 125 μm.

For glass heat-treated for 24 hours at 540° C., the following chemical etching was carried out:

3 g of the obtained powder are placed in a Savillex® (this is a sealed Teflon container) with 30 mL of an HCl solution, at a concentration of 0.5 mol/L.

This «Savillex®» is then placed for 6 hours in an oven at 90° C. After this chemical etching, the powder is then filtered and washed with ultra pure water several times, and then dried in the oven at 120° C. for 24 hours.

A specific surface area and porosity measurement is then conducted with a BET apparatus.

A microporous (with about 7 $m^2$/g of microporosity) and mesoporous sample with a specific surface area of 65 $m^2$/g and a pore size of 8 nm is obtained.

Example 2: Grafting and Synthesis of Nickel Hexacyanoferrate Nanoparticles in the Porous Glass The grafting of —$(CH_2)_2C_5H_4N$ within the pores of the glass, prepared in Example 1 is accomplished by refluxing the porous glass powder in toluene in the presence of the organic compound $(CH_3O)_3Si(CH_2)_2C_5H_4N$ for one night.

Then, 2 g of the thereby grafted glass powder are placed in a $3.65 \cdot 10^{-2}$M[Ni(H_2O)_6]Cl_2$ solution in methanol.

This mixture is stirred for one night at room temperature.

After filtration, the powder is washed several times with methanol and then dried in vacuo at room temperature for 24 hours.

In a second phase, the thereby obtained powder is put into a $2.5 \cdot 10^{-2}$M solution of the complex $[N(C_4H_9)_3][Fe(CN)_6]$ in methanol. The mixture is stirred for 48 hours at room temperature. The powder is then filtered, washed several times with methanol and dried in vacuo. These treatments first with the metal salts and then with the cyanometallate precursors are repeated a second time.

The chemical analyses of the thereby obtained powder show an Fe content of the order of 2% by mass.

Example 3: Fixing Cesium

The grafted glass powders elaborated in Example 2 are then tested as to the fixing of Cs (see FIG. 4).

The solution used for these tests contains 0.1 mol/L of $NaNO_3$ and the pH is comprised between 7 and 8. The large sodium nitrate content is required for correctly simulating the ionic force of actual industrial solutions.

In a 50 mL volume of this solution, 4.4 g of $CsNO_3$ are introduced (which gives a concentration of 60.2 mg/L) and also 50 mg of the grafted porous glass obtained in Example 2 (i.e. 1 g of grafted porous glass per L of solution).

The initial measured concentration (Ci) of Cs is 60.2 mg/L.

The whole is stirred for 25 hours at room temperature. After filtration, the solution is analyzed by ion chromatography.

After this filtration step, the residual solution is analyzed. The final measured concentration (Cf) of Cesium is 44.3 mg/L.

The decontamination factor (Kd) is calculated in this way:

$$Kd=(Ci-Cf)/Cf*Vsol/m\text{support}$$

This factor is therefore equal to 372 mL/g in this example.

In this example, 20 mg of Fe were grafted per gram of glass, and 16.5 mg of Cs were fixed (bound) per g of glass.

Example 4: Closing the Porosity

Closing the porosity in order to confine the thereby trapped cesium is accomplished by a heat treatment from 5 to 10 minutes at 800° C.

For example, a heat treatment of the porous sample for 6 minutes at 800° C. reduces the specific surface area of a sample heat-treated for 24 hours at 540° C., and then chemically treated with 0.5 M HCl for 24 hours from a 73 $m^2$/g specific surface area to a specific surface area of 19 $m^2$/g, which demonstrates closing of the pores.

REFERENCES

[1] J. Lehto, L Szirtes, "*Effects of gamma irradiation on cobalt hexacyanoferrate (II) ion exchangers*", Radiat. Phys. Chem. 43, (1994), 261-264.
[2] H. Loewenschuss, "*Metal ferrocyanide complexes for the decontamination of caesium from aqueous radioactive waste*", Radioactive waste management 2, (1982), 327-341.

[3] Mimura et al. J., Nucl. Sci Technol., 34, (1997), 484, and 34, (1997), 607.

[4] E. H. Tusa, A. Paavola, R. Harjula, J. Lehto, "*Industrial scale removal of cesium with hexacyanoferrate exchanger—Process realization and test run*", Nuclear Technology, 107, (1994), 279.

[5] R. Harjula, J. Lehto, A. Paajanen, L. Brodkin, E. Tusa, "*Removal of radioactive cesium from nuclear waste solutions with the transition metal hexacyanoferrate ion exchanger CsTreat*", Nuclear Science and Engineering, 137, (2001), 206-214.

[6] R. Harjula, J. Lehto, A. Paajanen, E. Tusa, P. Yarnell, "*Use inorganic ion exchange materials as precoat filters for nuclear waste effluent treatment*", Reactive and Functional Polymers, 60, (2004), 85-95.

[7] H. Mimura, M Kimura, K. Akiba, Y. Onodera, "*Selective removal of cesium from highly concentrated sodium nitrate neutral solutions by potassium nickel hexacyanoferrate (II)-loaded silica gels*", Solvent extraction and ion exchange, 17(2), 403-417, (1999).

[8] R. D. Ambashta, P. K. Wattal, S. Singh, B. Bahadur, "*Nano-aggregates of hexacyanoferrate (II)-loaded magnetite for removal of cesium from radioactive wastes*", Journal of Magnetism and Magnetic Materials, 267, (2003), 335-340.

[9] A. Mardan, R. Ajaz, "*A new method for preparation of silica potassium cobalt hexacyanoferrate composite ion exchanger from silica sol*", J. Radioanalytical and Nuclear Chemistry, Vol. 251, No. 3, (2002), 359-361.

[10] L. Sharygin, A. Muromskiy, M. Kalyagina, S. Borovkov, "*A granular inorganic cation-exchanger selective to cesium*", J. Nuclear Science and Technology, 44 (5), 767-773, (2007).

[10 bis] L. M. Sharygin; V. E. Moiseev; A. Yu Muromski, et al., « Inorganic spherical granual composite sorbent based on zirconium hydroxide and its production process», RU-A-2113024.

[11] C. Loos-Neskovic, C. Vidal-Madjar, J. Dulieu, A. Pantazaki, Application FR-A1-2 765 812 (Jul. 9, 1997), Application WO-A1-99/02255.

[12] C. Loos-Neskovic, C. Vidal-Madjar, B. Jimenez, A. Pantazaki, V. Federici, A. Tamburini, M. Fedoroff, E. Persidou, "*A copper hexacyanoferrate/polymer/silica composite as selective sorbent for the decontamination of radioactive caesium*", Radiochim. Acta., 85, (1999), 143-148.

[13] S. Milonjic, I. Bispo, M. Fedoroff, C. Loos-Neskovic, C. Vidal-Madjar, "*Sorption of cesium on copper hexecyaniferrate/polymer/silica composites in batch and dynamic conditions*", Journal of Radioanalytical and Nuclear Chermistry, Vol. 252, (2002), 497-501.

[14] Chin-Yuang Chang, L. K. Chau, W. P. Hu, C. Y. Wang, J. H. Liao, "*Nickel hexacyanoferrate multilayers on functionalized mesoporous silica supports for selective sorption and sensing of cesium*", Microporous and mesoporous materials, 109, (2008), 505-512.

[15] Y. Lin, X. Cui, "*Electrosynthesis, characterization and application of novel hybrid materials based on carbon nanotube-polyaniline-nickel hexacyanoferrate nanocomposites*", Journal of Materials Chemistry, 16, (2006), 585-592.

[16] Folch, B., Guari et al., "*Synthesis and behaviour of size controlled cyano-bridged coordination polymer nanoparticles within hybrid mesoporous silica*", (2008), New Journal of Chemistry, Vol. 32, Number 2, 273-282.

What is claimed is:

1. A nanocomposite solid material comprising nanoparticles and a support, the nanoparticles comprising a metal coordination polymer with CN ligands comprising cations $M^{n+}$, wherein M is a transition metal and n is 2 or 3; and anions $[M'(CN)_m]^{x-}$, wherein M' is a transition metal, x is 3 or 4 and m is 6 or 8; said $M^{n+}$ cations of the coordination polymer being bound through an organometallic bond to an organic group of an organic graft chemically attached inside pores of the support made of porous glass, and the pores of the porous glass being obtained by selective chemical etching of a borate phase of a solid borosilicate glass, the borosilicate glass comprising $SiO_2$, $Na_2O$, and $B_2O_3$, the proportion of each being defined to be within the composition of which is located in a demixing area of a phase diagram of $SiO_2$—$Na_2O$—$B_2O_3$.

2. The material according to claim 1, wherein $M^{n+}$ is $Fe^{2+}$, $Ni^{2+}$, $Fe^{3+}$ or $Co^{2+}$.

3. The material according to claim 1, wherein M' is $Fe^{2+}$ or $Fe^{3+}$ or $Co^{3+}$ and m is 6; or else M' is $Mo^{5+}$ and m is 8.

4. The material according to claim 1, wherein $[M'(CN)_m]^{x-}$ is $[Fe(CN)_6]^{3-}$, $[Fe(CN)_6]^{4-}$, $[Co(CN)_6]^{3-}$ or $[Mo(CN)_8]^{3-}$.

5. The material according to claim 1, wherein the cations $M^{n+}$ are $Ni^{2+}$, $Fe^{2+}$ or $Fe^{3+}$ cations and the anions are $[Fe(CN)_6]^{3-}$ or $[Fe(CN)_6]^{4-}$ anions.

6. The material according to claim 1, wherein the cations are $Fe^{3+}$ cations and the anions are $[Mo(CN)_8]^{3-}$ anions.

7. The material according to claim 1, wherein the cations are $Co^{2+}$ or $Ni^{2+}$ cations and the anions are $[Co(CN)_6]^{3-}$ anions.

8. The material according to claim 1, wherein the particles have the shape of a sphere or spheroid.

9. The material according to claim 1, wherein the nanoparticles have a size from 3 nm to 30 nm.

10. The material according to claim 1, wherein the organic group is selected from the group consisting of nitrogen-containing groups and oxygen-containing groups.

11. The material according to claim 1, wherein the support appears in the form of particles.

12. The material according to claim 11, wherein the support appears in the form of particles, having a grain size from 10 to 500 µm.

13. The material according to claim 1, wherein the support has a BET specific surface area from 10 to 500 m²/g and a porosity from 25 to 50% by volume.

14. The material according to claim 1, wherein the support has one or more types of pore sizes selected from the group consisting of microporosity, mesoporosity and macroporosity.

15. The material according to claim 1, wherein the support has an average pore size from 2 to 120 nm.

16. The material according to claim 1, wherein the pores of the support are defined by partitions, or walls, with a thickness from 10 to 60 nm.

17. A method for preparing the material according to claim 1, wherein the following successive steps are carried out:
   a) preparing a support made of the porous glass of claim 1;
   b) chemically attaching attachment of the organic graft inside the pores of the support made of porous glass;
   c) contacting the support made of porous glass inside the pores of which the organic graft is attached with a solution containing the $M^{n+}$ ion;
   d) washing the contacted support one or more times and drying the washed support;

e) contacting the dried support made of porous glass with a solution of a complex of $[M'(CN)_m]^{x-}$;

f) washing the support contacted with $[M'(CN)_m]^{x-}$ one or more times and drying the washed support contacted with $[M'(CN)_m]^{x-}$;

g) washing the support contacted with $[M'(CN)_m]^{x-}$ one or more times and drying the support; and h) optionally repeating steps c) to g).

18. The method according to claim 17, wherein, prior to chemical etching, the solid sodium borosilicate glass is heat-treated.

19. The method according to claim 17, wherein chemical etching comprises etching with an acid solution.

20. The method according to claim 17, wherein the organic graft is pyridine, and the chemical attachment of the organic graft inside the pores of the support made of porous glass is achieved by bringing the porous support in contact with a solution of $(CH_3O)_3Si(CH_2)_2C_5H_4N$.

21. The method according to claim 17, wherein the solution containing the $M^{n+}$ ion is a solution of $[M(H_2O)_6]Cl_2$ or $[M(H_2O)_6]Cl_3$.

22. The method according to claim 17, wherein the $[M'(CN)_m]^{x-}$ complex fits the following formula:

(Cat)x $[M'(CN)_m]$, wherein M', m, and x have the meaning already given in claim 1, and Cat is a cation selected from cations of alkaline metals, quaternary ammomiums, and phosphoniums.

23. The method according to claim 17, wherein steps c) to g) are repeated 1 to 4 times.

24. A method for fixing at least one mineral pollutant contained in a solution, wherein said solution is brought into contact with the nanocomposite solid material according to claim 1, whereby the mineral pollutant is immobilized inside the pores of the solid material.

25. The method according to claim 24, wherein said solution is an aqueous solution.

26. The method according to claim 24, wherein said solution is a process liquid or an industrial effluent.

27. The method according to claim 24, wherein said solution is selected from liquids and effluents from nuclear industry and nuclear installations and from activities applying radionuclides.

28. The method according to claim 24, wherein the method is carried out continuously.

29. The method according to claim 24, wherein the composite solid material fixing mineral pollutants is packed in a column.

30. The method according to claim 24, wherein said pollutant is present at a concentration of 0.1 picogram/L to 100 mg/L.

31. The method according to claim 24, wherein said pollutant stems from a metal or from a radioactive isotope of said metal.

32. The method according to claim 31, wherein said pollutant is selected from anionic complexes, colloids and cations.

33. The method according to claim 24, wherein said pollutant is an element selected from the group consisting of Cs, Co, Ag, Ru, Fe and Tl and isotopes thereof.

34. The method according to claim 24, wherein at the end of the contacting, the nanocomposite solid material is subjected to a treatment for closing its pores.

35. The method according to claim 34, wherein the treatment for closing the pores is a heat treatment carried out at a temperature from 600 to 1,000° C., or a radiative treatment generally of low energy, or a chemical treatment.

36. The method according to claim 35, wherein the chemical treatment is carried out in a basic atmosphere.

37. The material according to claim 9, wherein said size is a diameter.

38. The material according to claim 11, wherein said particles are beads, fibers, tubes or plates.

39. The material according to claim 15, wherein said support has an average pore size from 2 to 20 nm.

40. The method according to claim 19, wherein said etching with an acid solution is followed by etching with a basic solution.

* * * * *